United States Patent [19]

Beck

[11] 4,346,910
[45] Aug. 31, 1982

[54] ANTI-JACKNIFE DEVICE

[75] Inventor: Milton A. Beck, Marion, S.C.

[73] Assignee: Larry Harold Kline, Charleston, S.C.

[21] Appl. No.: 173,916

[22] Filed: Jul. 31, 1980

[51] Int. Cl.³ .......................................... B62D 53/06
[52] U.S. Cl. ...................................................... 280/432
[58] Field of Search ............... 280/432, 446 B, 405 A, 280/766, 474, 448, 406 R, 406 A; 188/3 R, 3 H

[56] References Cited

U.S. PATENT DOCUMENTS

| | | | |
|---|---|---|---|
| 2,545,339 | 3/1951 | Brewster | 280/432 |
| 2,815,223 | 12/1957 | Wharton | 280/406 R |
| 3,006,660 | 10/1961 | Merz | 280/432 X |
| 3,136,566 | 6/1964 | Harding | 280/432 X |
| 3,507,517 | 4/1970 | Eagle | 280/432 |
| 3,883,160 | 5/1975 | Meyers | 280/432 |
| 3,913,324 | 10/1975 | Miller et al. | 180/133 |
| 4,067,592 | 1/1978 | Horton | 280/432 |
| 4,071,147 | 1/1978 | Hornagold | 280/766 |
| 4,161,329 | 7/1979 | Pilz et al. | 280/432 X |

Primary Examiner—John A. Pekar
Attorney, Agent, or Firm—Larry Harold Kline

[57] ABSTRACT

A device is disclosed for use with a vehicle and a trailer comprising a structure secured to the vehicle, including a mechanical device that operates, when activated, to extend rigidly between the vehicle and the trailer and an activation system secured to the vehicle and operative to activate the mechanical device at a prespecified condition during the operation of the vehicle.

19 Claims, 5 Drawing Figures

ANTI-JACKNIFE DEVICE

This invention relates to a safety device and, more particularly, to a device which can reduce or prevent the incidence of jackknifing in tractor-trailer trucks.

In a panic or emergency stop situation when a tractor-trailer truck comes to an immediate stop, the trailer sometimes swings to the side into a jackknife position.

Other unusual driving conditions or circumstances can cause the trailer of a tractor-trailer truck to swing into the jackknife position. When the tractor-trailer truck jackknifes, a dangerous condition occurs for both the occupants of the tractor-trailer truck and the other motorists or pedestrians. The present invention helps prevent these dangerous conditions by reducing or preventing the incidence of jackknifing in tractor-trailer trucks.

An object of the present invention is to provide an anti-jackknife device that can reduce or prevent the incidence of jackknifing in tractor-trailer trucks.

Another object of this invention is to provide a device which stabilizes the trailer of a tractor-trailer truck in a panic or emergency stop situation.

Still another object of this invention is to provide a hydraulic device that, when activated, would extend rigidly between the tractor and the trailer of a tractor-trailer truck.

A further object of this invention is to have a control system for an anti-jackknife device which operates automatically in a panic or emergency stop situation and is then easily deactivated to allow normal operation.

A further object of this invention is to provide an anti-jackknife system with stop pads that are replaceable and portions which are easily maintainable.

Another object of this invention is to provide a device which can be utilized to stabilize the trailer of a vehicle in any situation in which further stabilization is desired.

These and other objects and features of the invention will be apparent from the following description and appended claims.

Briefly, the invention is a device for use with a vehicle and a trailer comprising a structure secured to the vehicle including mechanical means that is operative when activated to extend rigidly between the vehicle and the trailer. An activation means is secured to the vehicle and is operative to activate the mechanical means at a pre-specified condition during the operation of the vehicle.

The mechanical means comprises a first hydraulic cylinder means secured to the vehicle and a first moveable hydraulic shaft secured within the first hydraulic means. The first moveable hydraulic shaft is operative when the mechanical means is activated to extend rigidly between the first hydraulic cylinder means and the trailer. The mechanical means further comprises a first stop means secured to the first moveable hydraulic shaft. When the mechanical means is activated and the first moveable hydraulic shaft extends rigidly between the first hydraulic cylinder means and the trailer, the first stop means will press against the trailer.

The first stop means comprises a first anchoring plate secured to the first moveable hydraulic shaft, a first backing plate secured to the first anchoring plate, and a first stop pad secured to the first backing plate. The first stop pad is removeable and replaceable.

The first hydraulic cylinder means comprises a first hydraulic cylinder and a first rigid shaft extending from the first hydraulic cylinder and secured to the vehicle.

A first hydraulic supply line is connected to the first hydraulic cylinder and is operative to carry hydraulic fluid when the mechanical means is activated by the activation means.

The first stop means further comprises an additional first anchoring plate which is secured to the first moveable hydraulic shaft. There is an opening in the first anchoring plate. There is an opening in the additional first anchoring plate. A first stop securing means is operative to extend through the opening in the first anchoring plate and the first moveable hydraulic shaft, and the opening in the additional first anchoring plate in order to secure the first stop means to the first moveable hydraulic shaft.

The structure further comprises a first rigid mounting bracket secured to the vehicle and to the first hydraulic cylinder means. The activation means comprises a sensing means secured within the vehicle and operative to sense a pre-specified condition during the operation of the vehicle. A hydraulic pump means is secured to the vehicle and is operative to be activated by the sensing means. The activation means further comprises a vehicle brake system secured within the vehicle. The sensing means comprises a pressure sensor which is operative to sense the pre-specified condition of an emergency braking situation. In the emergency braking situation, the pressure sensor will activate the hydraulic pump means so that the mechanical means will be activated by the hydraulic pump means and extend rigidly between the vehicle and the trailer. The activation means further comprises release means secured to the vehicle and operative to deactivate the hydraulic pump means so that the mechanical means will be deactivated to a passive position.

The mechanical means may further comprise a second hydraulic cylinder means secured to the vehicle and a second moveable hydraulic shaft secured within the second hydraulic means. The mechanical means further comprises a second stop means secured to the second moveable hydraulic shaft. The second stop means further comprises a second anchoring plate which is secured to the second moveable hydraulic shaft, a second backing plate secured to the second anchoring plate, and a second stop pad secured the second backing plate. The second stop pad is also removeable and replaceable. The second hydraulic cylinder means comprises a second hydraulic cylinder and a second rigid shaft extending from the second hydraulic cylinder. A second hydraulic supply line is connected to the second hydraulic cylinder. The second stop means further comprises an additional second anchoring plate which is secured to the second moveable hydraulic shaft. The second anchoring plate has an opening. The additional second anchoring plate has an opening. A second stop securing means is operative to extend through the opening in the second anchoring plate, the second moveable hydraulic shaft, and the opening in the additional second anchoring plate in order to secure the second stop means to the second moveable hydraulic shaft.

The structure further comprises a second mounting bracket secured to the vehicle and to the second hydraulic cylinder means.

The invention will be more fully understood from the following detailed description and appended claims when taken with the drawings in which:

Figure 1:
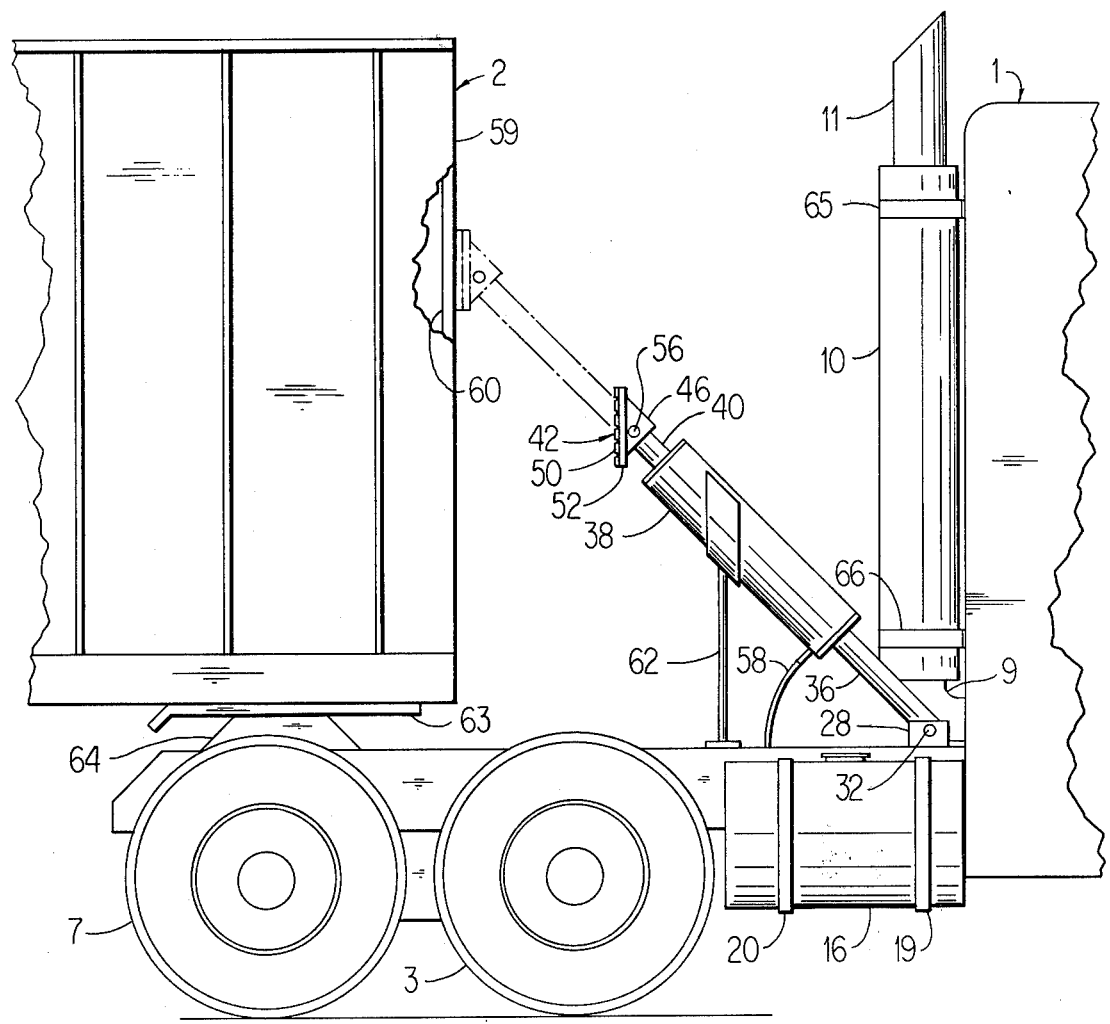
FIG. 1 is a partial right side view of a tractor 1 and a trailer 2 showing the anti-jackknife device in a passive state with the active state of the anti-jackknife device shown in phantom lines.

Referring now to the drawings, FIG. 1 is a partial right side view of a tractor 1 and a trailer 2. FIG. 1 shows the anti-jackknife device in a passive state with the active state of the anti-jackknife device shown in phantom lines.

Figure 2:
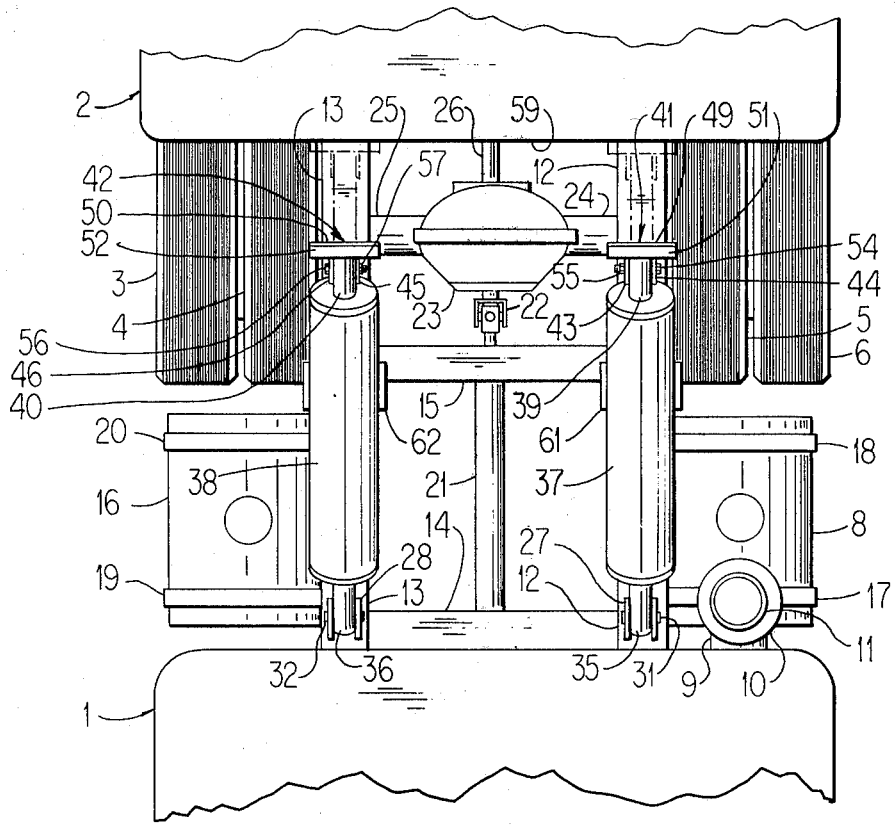
FIG. 2 is a partial top view of the tractor 1 and the trailer 2 shown in FIG. 1 with the anti-jackknife device in a passive state with the active state of the anti-jackknife device shown in phantom lines.

Tractor 1 has a right outside tractor tire 3, a right inside tractor tire 4, left inside tractor tire 5, and a left outside tractor tire 6 (see FIG. 2). Tractor 1 has front tires which are not shown in the drawings. Tractor 1 also has a right rear tractor tire 7 and a left rear tractor tire (not shown). Tractor 1 has gas tanks 8 and 16. Tractor 1 has an exhaust system including exhaust pipe 9, muffler 10, and stack pipe 11. Muffler 10 is secured to tractor 1 by upper muffler support 65 and lower muffler support 66.

FIG. 2 is a partial top view of the tractor 1 and trailer 2 in FIG. 2. The anti-jackknife device is shown in a passive state with the active state of the anti-jackknife device shown in phantom lines.

The tractor 1 has a plurality of frame members including left vertical frame member 12, right vertical frame member 13, horizontal frame member 14, and horizontal frame member 15.

Gas tank 8 is secured to tractor 1 by securing bands 17 and 18. Gas tank 16 is secured to tractor 1 by securing bands 19 and 20.

Tractor 1 also comprises a drive shaft 21, universal joint 22, differential 23, left axle housing 24, right axle housing 25, and connecting shaft 26.

The left portion of the anti-jackknife device is connected to left vertical frame member 12 by left rigid mounting bracket 27 and left securing pin 31. The right portion of the anti-jackknife device is connected to the right vertical frame member 13 by right rigid mounting bracket 28 and right securing pin 32. Left securing pin 31 extends through left outside opening 29 and left inside opening 30 in left rigid mounting bracket 27. Right securing pin 32 extends through right outside opening (not shown) and left inside opening (not shown) in right rigid mounting bracket 28. The left securing pin 31 is secured within left rigid mounting bracket 27 by left inside securing means 33 and left outside securing means 34. The right securing pin 32 is secured within right rigid mounting bracket 29 by right inside securing means (not shown) and right outside securing means (not shown).

Figure 3:
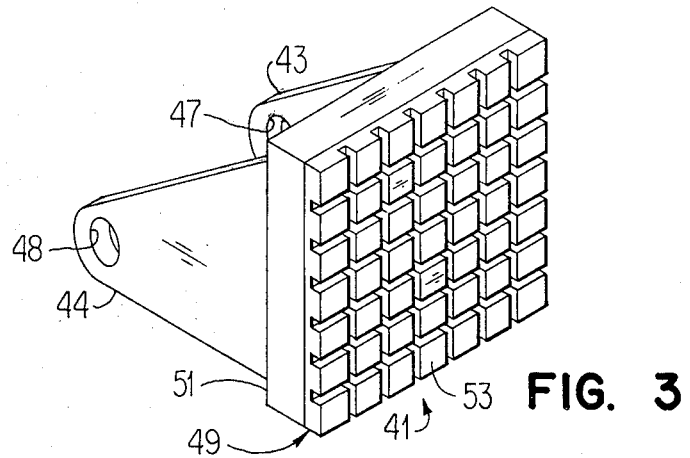
FIG. 3 is an isometric view of the left stop 41 of the anti-jackknife device.

FIG. 3 is an isometric view of the left stop 41. Right stop 42 is similar to left stop 41. Left stop 41 comprises a left inside stop anchoring plate 43 and a left outside stop anchoring plate 44. Right stop 42 comprises a right inside stop anchoring plate 45 and a right outside stop anchoring plate 46. Left inside stop anchoring plate 43 has an opening 47. Left outside stop anchoring plate 44 has an opening 48. Right inside stop anchoring plate 45 and right outside stop anchoring plate 46 have openings which are not shown.

Left inside stop anchoring plate 43 and left outside stop anchoring plate 44 are rigidly secured to backing plate 51. Right inside stop anchoring plate 45 and right outside stop anchoring plate 46 are rigidly secured to back plate 52. Left pad 49 for left stop 41 is connected to backing plate 51. Right stop pad 50 for right stop 42 is connected to backing plate 52. Left stop pad 49 and right stop pad 50 are replaceable stop pads. Left stop pad 49 has a gripping tread 53. Right stop pad 50 has a gripping tread which is not shown.

Left bolt 54 extends through opening 48 in left outside stop anchoring plate 44 through left moveable hydraulic shaft 39 and through opening 47 in left inside stop anchoring plate 43. Left bolt 54 is then secured by securing nut 55.

Right bolt 56 extends through the openings in right inside stop anchoring plate 45 and right outside stop anchoring plate 46 and through the right moveable hydraulic shaft 40. Right bolt 56 is secured by right securing nut 57.

The left portion of the anti-jackknife device basically comprises left rigid shaft 35, left hydraulic cylinder 37, left moveably hydraulic shaft 39, and left stop 41.

The right portion of the anti-jackknife device basically comprises right rigid shaft 36, right hydraulic cylinder 38, right moveable hydraulic shaft 40 and right stop 42.

Figure 4:
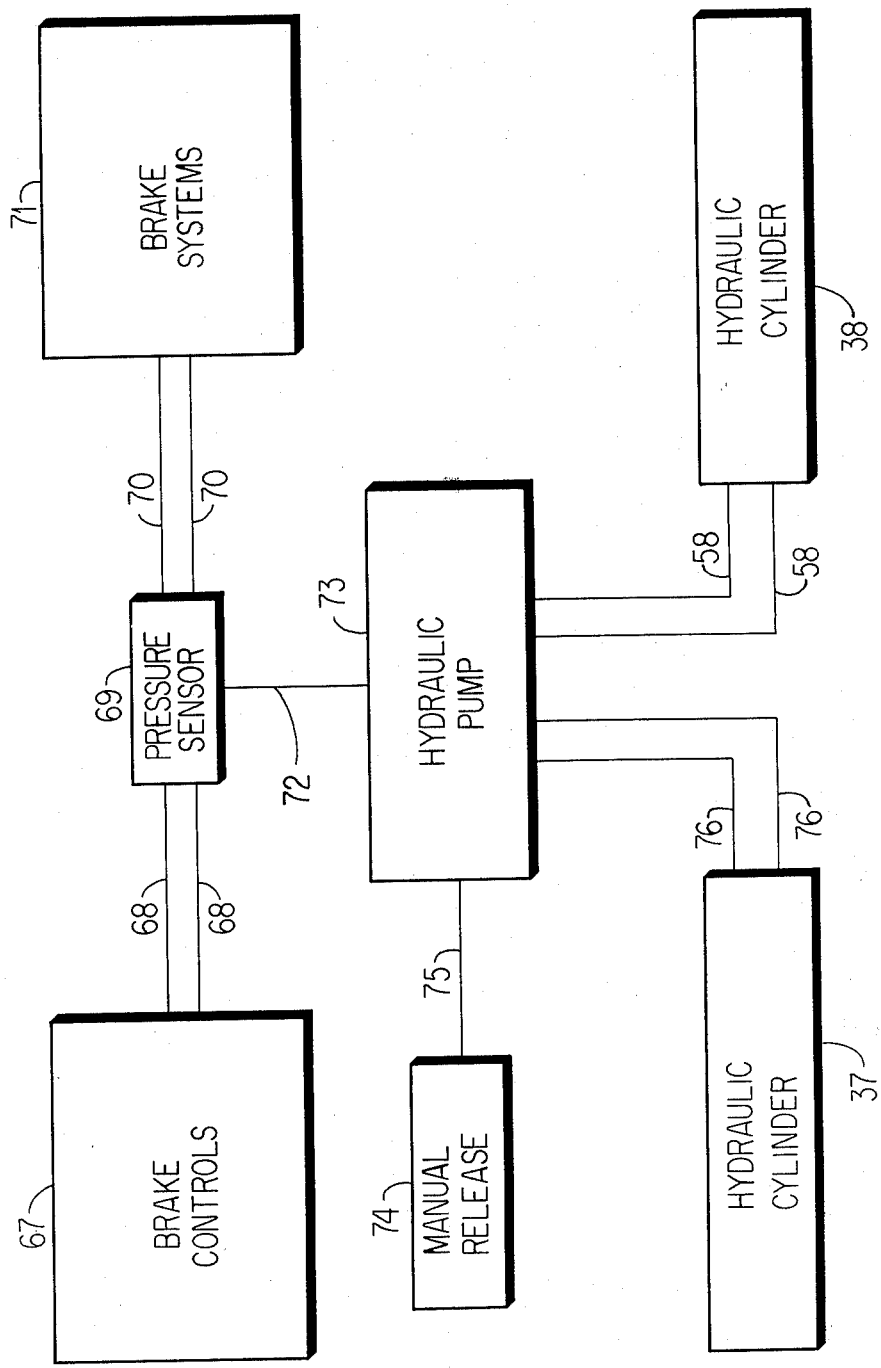
FIG. 4 is a schematic representation of the basic control system for the anti-jackknife device.

FIG. 4 is a schematic representation of the basic control system for the anti-jackknife device. This control system will be discussed in detail later in this specification.

Figure 5:
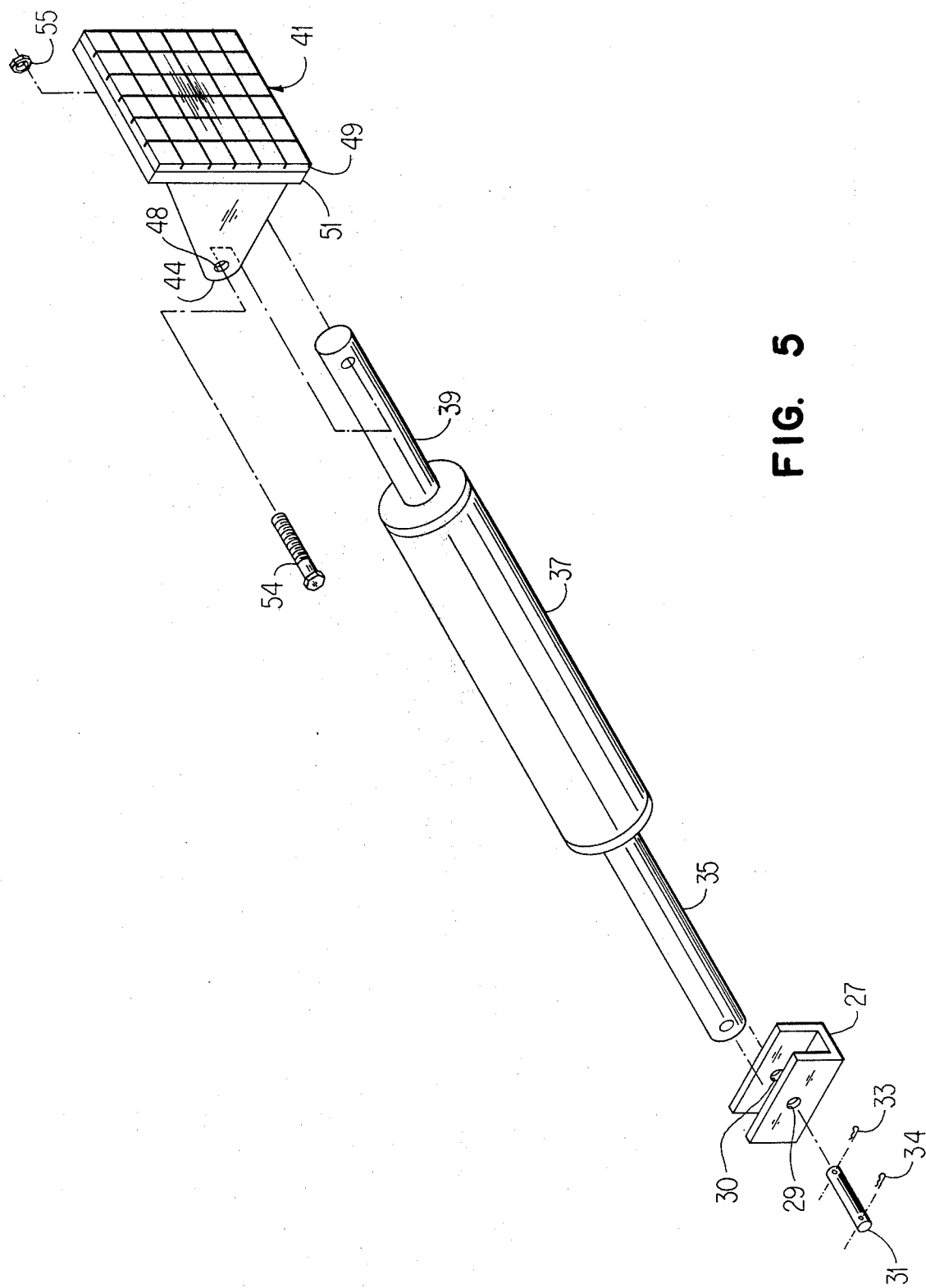
FIG. 5 is an exploded isometric view of the left portion of the anti-jackknife device.

FIG. 5 is an exploded isometric view of the left portion of the anti-jackknife device. Left securing pin 31 extends through left outside opening 29, through left rigid shaft 35, and through left inside opening 30 in order to secure the left rigid shaft 35 to rigid mounting bracket 27 which is rigidly secured to left vertical frame member 12 of tractor 1.

Left rigid shaft 35 is rigidly connected to left hydraulic cylinder 37. Left moveable hydraulic shaft 39 is within left hydraulic cylinder 37. When in a passive state, the left moveable hydraulic shaft 39 is held relatively close to left hydraulic cylinder 37. When the anti-jackknife system is activated, left moveable hydraulic shaft 39 rapidly extends forward to place left stop 41 rigidly against the trailer 2. Left stop 41 is secured to left moveable hydraulic shaft 39 as previously discussed.

When the anti-jackknife system is deactivated, the left moveable hydraulic shaft 30 withdraws into the left hydraulic cylinder 37 removing stop 41 from the trailer 2.

The right side of the anti-jackknife system is basically identical to the left side of the anti-jackknife system. The two sides are used basically for stability purposes. Any plurality of hydraulic shafts and stops may be utilized and is within the scope of this invention.

Right hydraulic cylinder 38 has a right hydraulic supply 58. Left hydraulic cylinder 37 has a left hydraulic supply 76 shown in FIG. 4.

Trailer 2 has a front surface 59. If desired, front surface 59 can have structural reinforcement 60.

The right hydraulic cylinder 38 is supported by right hydraulic cylinder support 62. The left hydraulic cylinder 37 is supported by left hydraulic cylinder support 61.

The trailer 2 is connected to tractor 1 by a fifth wheel 63. The fifth wheel support 64 is rigidly secured to trailer 2.

FIG. 4 is a schematic representation of the basic control system for the anti-jackknife system. A pressure sensor 69 is inserted into the brake system between the brake controls 67 within the truck and the total brake system 71. Brake lines 68 connects the brake control 67 to the pressure sensor 69.

Brake lines 70 connect the pressure sensor 69 to the brake system 71. The pressure sensor 69 would detect unusually high pressure in the brake system 71 caused by a panic or emergency stop. When the high pressure is sensed, the pressure sensor 69 would send an electronic impulse through control line 72 to the hydraulic pump 73 of the anti-jackknife system. The hydraulic pump 73 would then immediately activate hydraulic cylinders 37 and 38. Left hydraulic cylinder 37 is connected to the hydraulic pump 73 by left hydraulic supply 76. Right hydraulic cylinder 38 is connected to the hydraulic pump 73 by right hydraulic supply 58. The activation of left hydraulic cylinder 37 would cause left moveable hydraulic shaft 39 to extend outward and to press left stop 41 against the front surface 59 of trailer 2. The activation of right hydraulic cylinder 38 would cause right moveable hydraulic shaft 40 to extend outward and to press right stop 42 against the front surface 59 of trailer 2. The stop pads 49 and 50 press firmly against the front surface 59 of trailer 2 to prevent the trailer 2 from swinging to the side into the jackknife position.

Once the emergency situation has passed and normal operation of the tractor 1 and trailer 2 is desired, a release 74 may be energized through release line 75 to release the pressure on the hydraulic cylinders 37 and 38 and to retract the moveable hydraulic shafts 39 and 40 to the passive position.

The anti-jackknife system is designed to operate in an emergency stop situation on an unusually high pressure within the brake system and normal braking would not activate the anti-jackknife system.

The concept of this invention may be utilized in many different ways. Different hydraulic systems may be utilized. Different pressure sensors, system releases, and physical equipment may be utilized. Basically, the invention meets its purpose of reducing or preventing the incidence of jackknifing in tractor-trailer trucks.

The invention meets its objectives. The anti-jackknife device discussed herein can reduce or prevent the incidence of jackknifing in tractor-trailer trucks. The device discussed herein helps stabilize the tractor-trailer trucks in a panic or emergency stop situation. The hydraulic device, when activated, extends rigidly between the tractor and the trailer. A control system is disclosed herein for the anti-jackknife device which operates automatically in a panic or emergency stop situation and then is easily deactivated to allow normal operation. The stop pads may be replaceable and the portions of the anti-jackknife system are easily maintainable. The present invention may be utilized on any vehicle used with a trailer. The system can be desired to solve problems of alignment of trailers being towed.

The basic concepts of this invention can be utilized with the mechanical means comprising one hydraulic cylinder means and one moveable hydraulic shaft secured to one stop or with a plurality of hydraulic cylinder means moveable hydraulic shafts and stops.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device for use with a vehicle with a rear pivot connector and a trailor connectable to said rear pivot connector comprising:
   a. a structure secured to a horizontal surface of said vehicle, forward of said rear pivot connector, including mechanical means that is operative, when activated, to extend rigidly between said vehicle and the front vertical surface of said trailer;
   b. activation means secured to said vehicle and operative to activate said mechanical means at a pre-specified condition during the operation of said vehicle; and
   c. said mechanical means comprising:
      (1) a first hydraulic cylinder means secured to said vehicle;
      (2) a first moveable hydraulic shaft secured within said first hydraulic means and operative when activated to extend rigidly between said first hydraulic cylinder means and said trailer; and
      (3) a first stop means secured to said first moveable hydraulic shaft, whereby when said mechanical means is activated and said first moveable hydraulic shaft extends rigidly between said first hydraulic cylinder means and said trailer, said first stop means will press against said trailer,
   whereby when said pre-specified condition is reached during the operation of said vehicle, said structure extends rigidly between said vehicle and said front vertical surface of said trailer holding said vehicle and said trailer rigidly together.

2. A device according to claim 1 wherein said first stop means comprises:
   a. a first anchoring plate which is secured to said first moveable hydraulic shaft;
   b. a first backing plate secured to said first anchoring plate; and
   c. a first stop pad secured to said first backing plate;
   whereby when said mechanical means is activated and said first moveable hydraulic shaft extends rigidly between said first hydraulic cylinder means and said trailer, said first stop pad will press against said trailer.

3. A device according to claim 2 wherein said first stop pad is removeable and replaceable.

4. A device according to claim 2 wherein said first stop means further comprises:
   a. an additional first anchoring plate which is secured to said first moveable hydraulic shaft;
   b. an opening in said first anchoring plate;
   c. an opening in said additional first anchoring plate; and
   d. a first stop securing means operative to extend through said opening in said first anchoring plate, said first moveable hydraulic shaft, and said opening in said additional first anchoring plate in order to secure said first stop means to said first moveable hydraulic shaft.

5. A device according to claim 1 wherein said first hydraulic cylinder means comprises:
   a. a first hydraulic cylinder;
   b. a first rigid shaft extending from said first hydraulic cylinder and secured to said vehicle; and
   c. a first hydraulic supply line connected to said first hydraulic cylinder and operative to carry hydraulic fluid when said mechanical means is activated by said activation means.

6. A device according to claim 5 wherein said structure further comprises a first rigid mounting bracket secured to said vehicle and to said first hydraulic cylinder means.

7. A device according to claim 1 wherein said activation means comprises:
   a. sensing means secured within said vehicle operative to sense a pre-specified condition during the operation of said vehicle; and
   b. a hydraulic pump means secured to said vehicle and operative to be activated by said sensing means, said hydraulic pump means providing hydraulic fluid to said mechanical means.

8. A device according to claim 7 wherein said activation means further comprises:
   a. a vehicle brake system secured within said vehicle; and
   b. a pressure sensor comprised within said sensing means operative to sense the pre-specified condition of an emergency braking situation;
   wherein in said emergency braking situation, said pressure sensor will activate said hydraulic pump means so that said mechanical means will be activated by said hydraulic pump means and extend rigidly between said vehicle and said trailer.

9. A device according to claim 8 wherein said activation means further comprises release means secured to said vehicle and operative to deactivate said hydraulic pump means so that said mechanical means will be deactivated to a passive position.

10. A device according to claim 1 wherein said mechanical means comprises:
    a. a second hydraulic cylinder means secured to said vehicle; and
    b. a second moveable hydraulic shaft secured within said second hydraulic means and operative when activated to extend rigidly between said second hydraulic cylinder means and said trailer.

11. A device according to claim 10 wherein said mechanical means further comprises a second stop means secured to said second moveable hydraulic shaft; whereby when said mechanical means is activated and said second moveable hydraulic shaft extends rigidly between said second hydraulic cylinder means and said trailer, said second stop means will press against said trailer.

12. A device according to claim 11 wherein said second stop means comprises:
    a. a second anchoring plate which is secured to said second moveable hydraulic shaft;
    b. a second backing plate secured to said second anchoring plate; and
    c. a second stop pad secured to said second backing plate;
    whereby when said mechanical means is activated and said second moveable hydraulic shaft extends rigidly between said second hydraulic cylinder means and said trailer, said second stop pad will press against said trailer.

13. A device according to claim 12 wherein said second stop pad is removeable and replaceable.

14. A device according to claim 12 wherein said second stop means further comprises:
    a. an additional second anchoring plate which is secured to said second moveable hydraulic shaft;
    b. an opening in said second anchoring plate;
    c. an opening in said additional second anchoring plate; and
    d. a second stop securing means operative to extend through said opening in said second anchoring plate, said second moveable hydraulic shaft, and said opening in said additional second anchoring plate in order to secure said second stop means to said second moveable hydraulic shaft.

15. A device according to claim 10 wherein said second hydraulic cylinder means comprises:
    a. a second hydraulic cylinder;
    b. a second rigid shaft extending from said second hydraulic cylinder and secured to said vehicle; and
    c. a second hydraulic supply line connected to said second hydraulic cylinder and operative to carry hydraulic fluid when said mechanical means is activated by said activation means.

16. A device according to claim 15 wherein said structure further comprises a second rigid mounting bracket secured to said vehicle and to said second hydraulic cylinder means.

17. A device according to claim 10 wherein said activation means comprises:
    a. a sensing means secured within said vehicle operative to sense a pre-specified condition during the operative of said vehicle; and
    b. a hydraulic pump means secured to said vehicle and operative to be activated by said sensing means.

18. A device according to claim 17 wherein said activation means further comprises:
    a. a vehicle brake system secured within said vehicle; and
    b. a pressure sensor comprised within said sensing means operative to sense the pre-specified condition of an emergency braking situation;
    wherein in said emergency braking situation, said pressure sensor will activate said hydraulic pump means so that said mechanical means will be activated by said hydraulic pump means and extend rigidly between said vehicle and said trailer.

19. A device according to claim 18 wherein said activation means further comprises release means secured to said vehicle and operative to deactivate said hydraulic pump means so that said mechanical means will be deactivated to a passive position.

* * * * *